(12) United States Patent
Wu

(10) Patent No.: US 7,093,811 B2
(45) Date of Patent: Aug. 22, 2006

(54) CLAMPING BASE

(75) Inventor: Chieh-Feng Wu, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 11/049,169

(22) Filed: Feb. 3, 2005

(65) Prior Publication Data

US 2005/0230583 A1    Oct. 20, 2005

(30) Foreign Application Priority Data

Apr. 16, 2004   (TW) ............................... 93205886 U

(51) Int. Cl.
*A47B 96/06*   (2006.01)
(52) U.S. Cl. ........................ 248/229.12; 248/231.41; 248/912
(58) Field of Classification Search ............ 248/229.1, 248/229.12, 229.14, 227.2, 231.41, 231.61, 248/231.85, 229.22, 229.24, 558, 912; 24/523, 24/DIG. 22; 269/3, 6, 43, 271, 279, 280
See application file for complete search history.

(56) References Cited

U.S. PATENT DOCUMENTS

| 76,584 | A | * | 4/1868 | Barnes ........................ 269/73 |
|---|---|---|---|---|
| 286,376 | A | * | 10/1883 | Bellamy ...................... 269/245 |
| 1,889,742 | A | * | 12/1932 | Barclay ...................... 248/468 |
| 2,644,383 | A | * | 7/1953 | Ludwig ...................... 359/369 |
| 2,653,499 | A | * | 9/1953 | Partiss ........................ 269/280 |
| 2,666,612 | A | * | 1/1954 | Howell ........................ 248/310 |
| 3,635,431 | A | * | 1/1972 | Mariner ...................... 248/104 |
| 4,113,337 | A | * | 9/1978 | McKee ........................ 439/354 |
| 4,133,519 | A | * | 1/1979 | Shin et al. ................... 269/247 |
| 6,370,741 | B1 | * | 4/2002 | Lu ................................ 24/523 |
| 6,663,066 | B1 | * | 12/2003 | Hong .................... 248/231.41 |

* cited by examiner

*Primary Examiner*—Korie Chan

(57) ABSTRACT

The present invention is a clamping base, including a body capable of engaging with and holding a camera, and a second wall portion capable of being detached from and engaged with the body. The clamping base further includes a moving portion. The moving portion includes a sliding rod and a first wall portion set at one end of the sliding rod. The sliding rod can perform a push-pull movement on the body and the other end of the sliding rod is set inside the body.

6 Claims, 9 Drawing Sheets

CLAMPING BASE

FIELD OF THE INVENTION

The present invention relates to a base for a camera; particularly, it relates to a clamping base capable of flexibly adjusting a holding position so that a camera can be easily installed on the clamping base.

BACKGROUND OF THE INVENTION

The base for holding the conventional web cams to an electronic device, such as a notebook, an LCD, and so on, is as follows: One means is to adapt the clamping force of a damper so as to clamp the web cam on the electronic device. Although the damper can be adjusted according to the thickness of the various electronic devices, large clamping force can easily cause the electronic device to break. Furthermore, the main drawback of the damper is that for those electronic devices with a greater thickness, the length of the two clamping arms of the damper must be increased. Another means is to adapt a base in a slight n-shape so as to utilize the fixed size of the opening of the base; the two opposite sidewalls of the opening press against the two sides of the electronic device respectively. The main drawback of the n-shape base is that because the size of the opening of the n-shape base is fixed, it is only useful for the electronic device having the same thickness as the size of the opening.

Due to the two conventional means being limited to the thickness of the electronic device, the inventor of the present invention provides an improved easily adjustable clamping base so that the web cam can be more easily installed on the base in accordance with the thickness of a variety of electronic devices.

SUMMARY OF THE INVENTION

An objective of the present invention is to provide a clamping base capable of being detached from or engaged with a camera.

Another objective of the invention is to provide a clamping base for a camera which can flexibly adjust the holding position in accordance with various thicknesses of electronic devices.

In order to accomplish the above objectives, the present invention provides a clamping base of a camera, including a body capable of engaging with and holding a camera, and a second wall portion capable of being detached from and engaged with the body. The body includes a pressing plate, wherein the pressing plate is used to allow the camera to be inserted therein, and thus to press against and hold the camera. The clamping base further includes a moving portion; the moving portion includes a sliding rod and a first wall portion set at one end of the sliding rod; wherein the sliding rod can perform a push-pull movement on the body, and the other end of the sliding rod is set inside the body.

BRIEF DESCRIPTION OF THE DRAWINGS

The above objects and advantages of the present invention will become more apparent with reference to the appended drawings wherein.

DETAILED DESCRIPTION OF THE INVENTION

Figure 1:
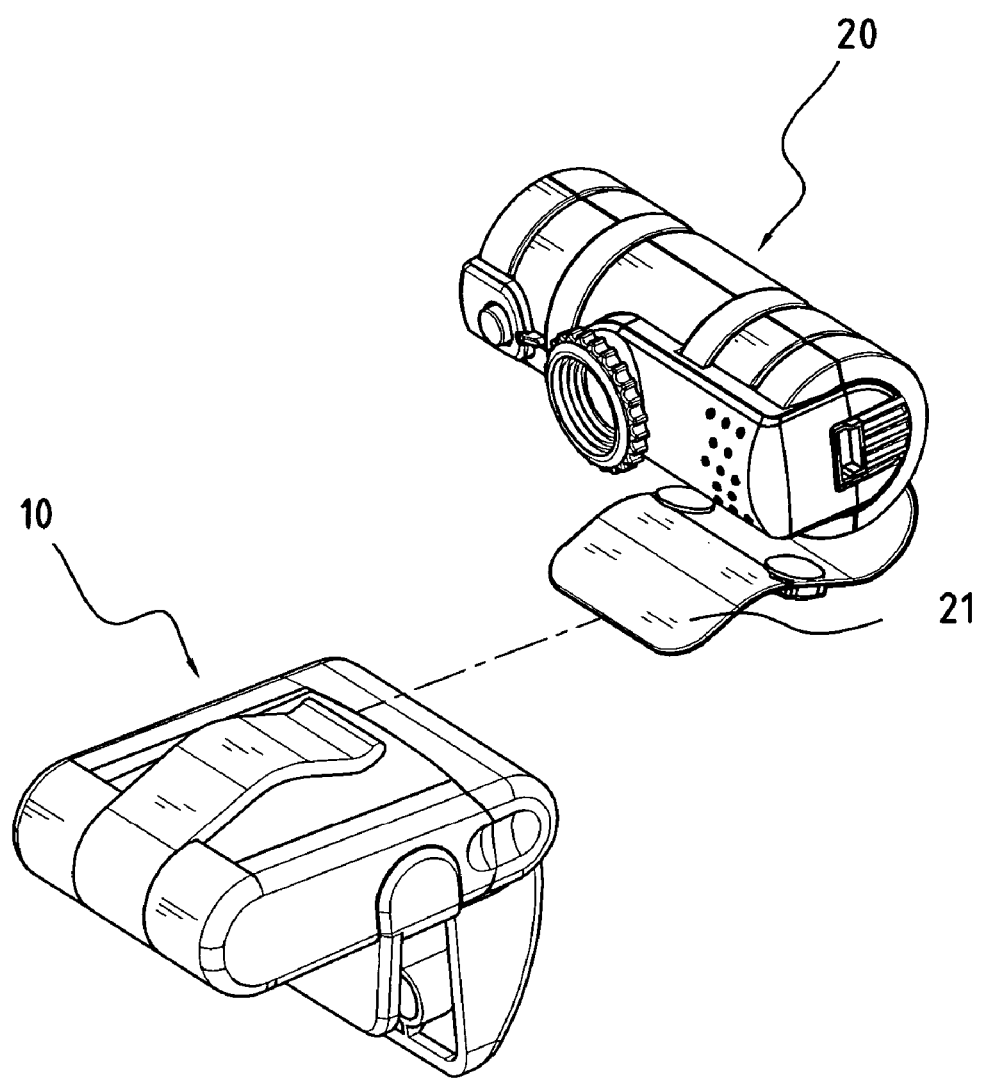
FIG. 1 shows a perspective view illustrating the clamping base of the present invention and the camera before engagement.
Figure 2:
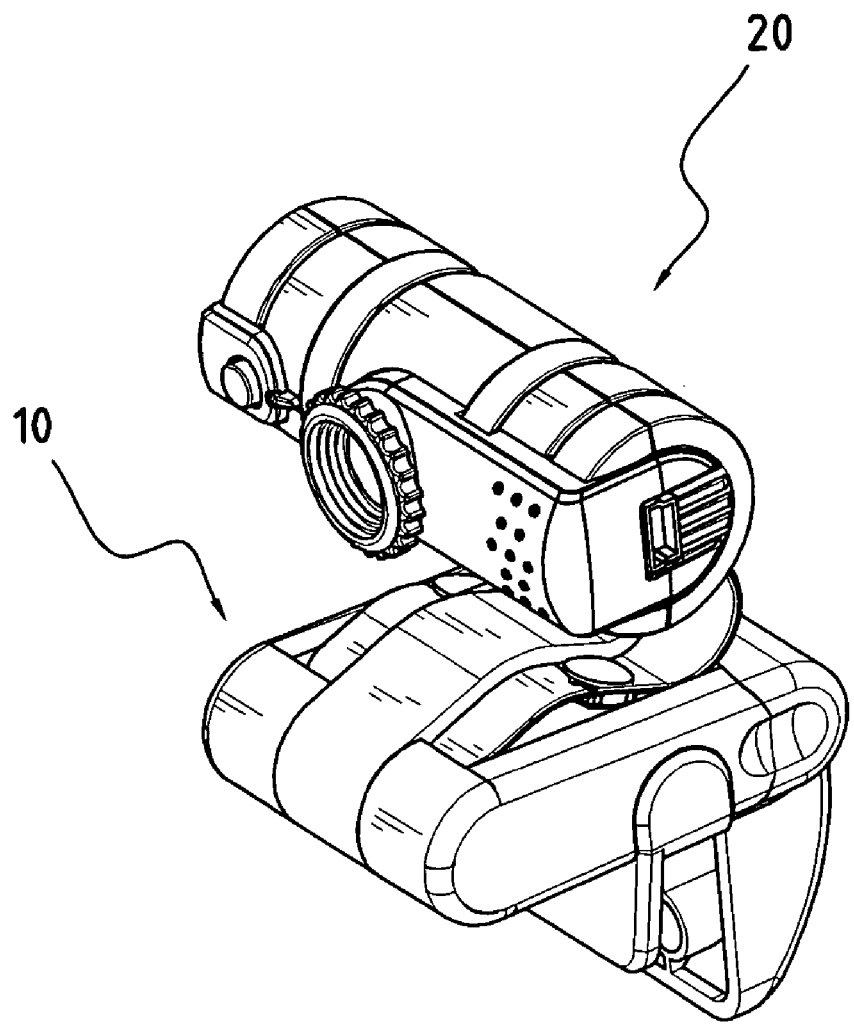
FIG. 2 shows a perspective view illustrating the clamping base of the present invention and the camera after engagement.
Figure 3:
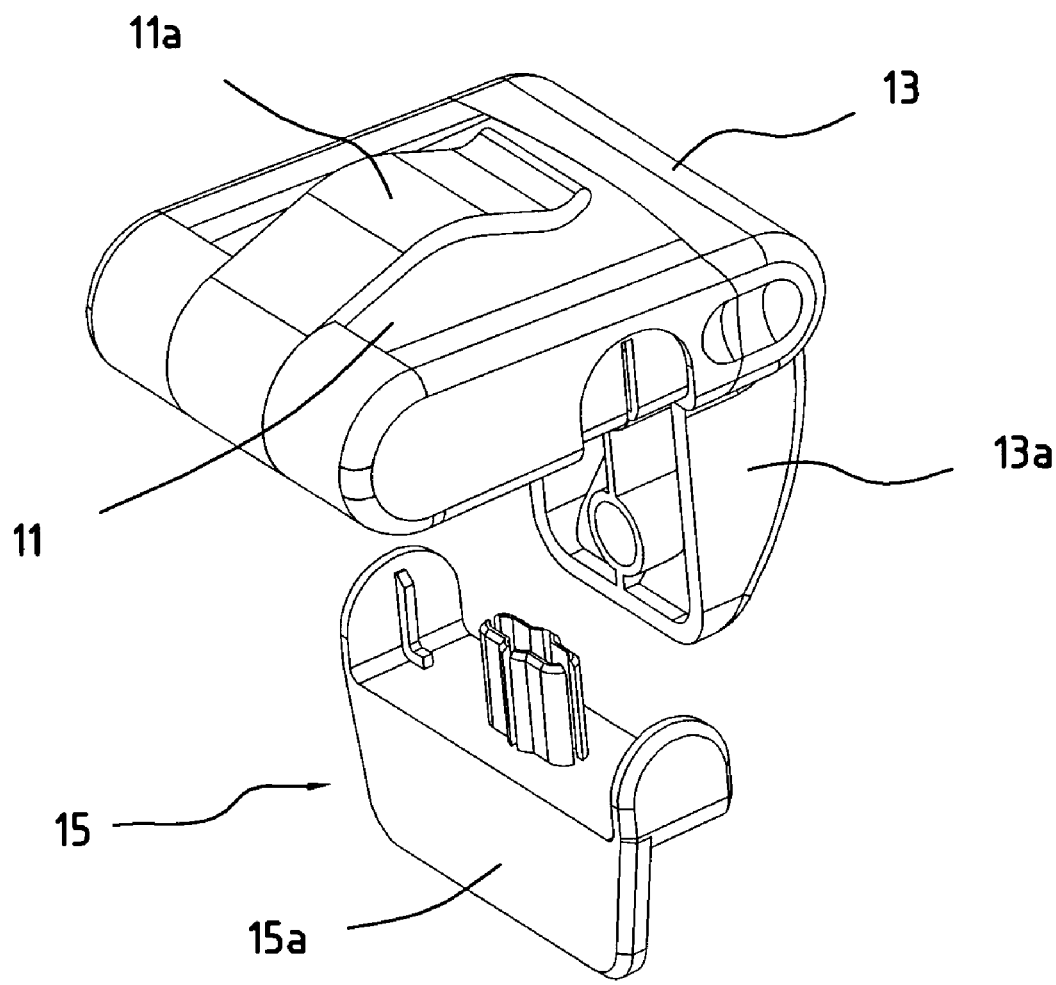
FIG. 3 shows a perspective view illustrating the clamping base of the present invention in which the first wall portion is detached from the body.

Referring to FIG. 1, FIG. 2 and FIG. 3, the elastic plate 21 of the camera 20 is inserted under the pressing plate 11a (as shown in FIG. 3) of the clamping base 10, that is, the elastic plate 21 is pressed against and held by the elasticity of the pressing plate 11a so that the camera 20 can be stably disposed on the clamping base 10. The material of the pressing plate 11a of the present invention can be made of a malleable plate, such as a plastic plate, or a metallic plate, etc.

Figure 4A:
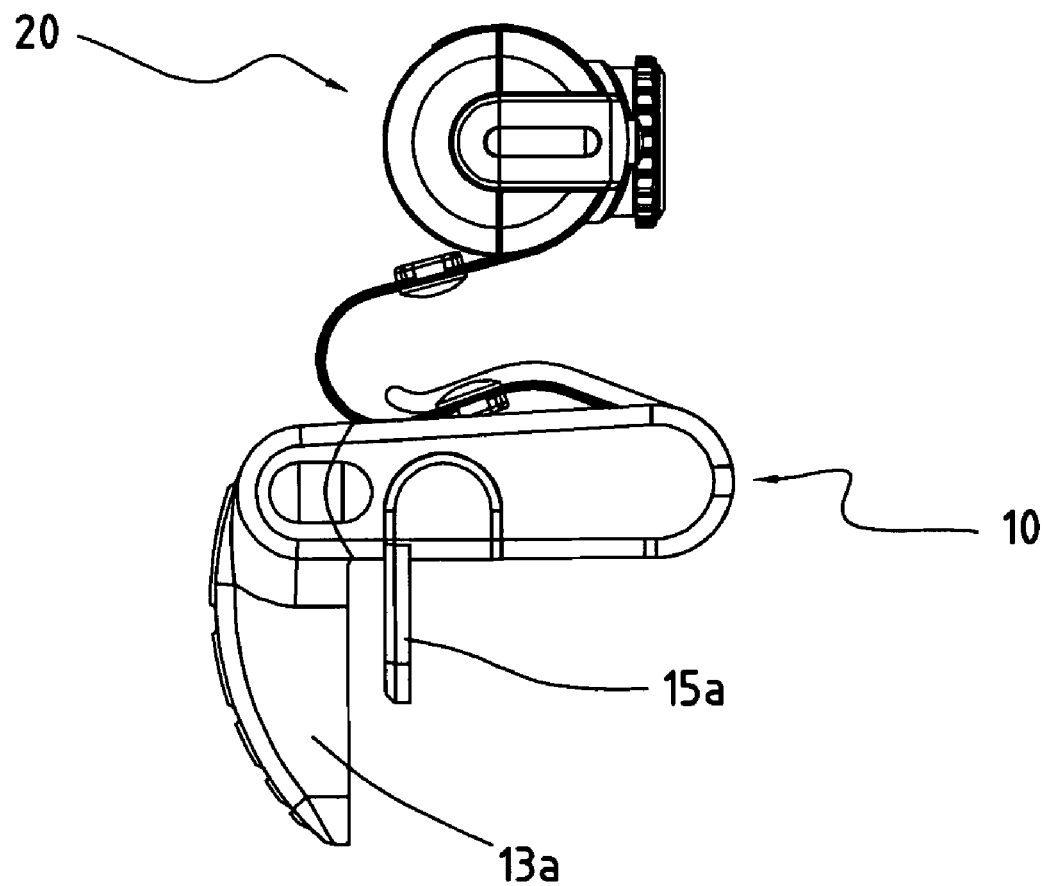
FIG. 4A shows a side elevational view of the clamping base with the camera illustrating the wallboard of the first wall portion being moved closed to the first wall portion of the moving portion.
Figure 4B:
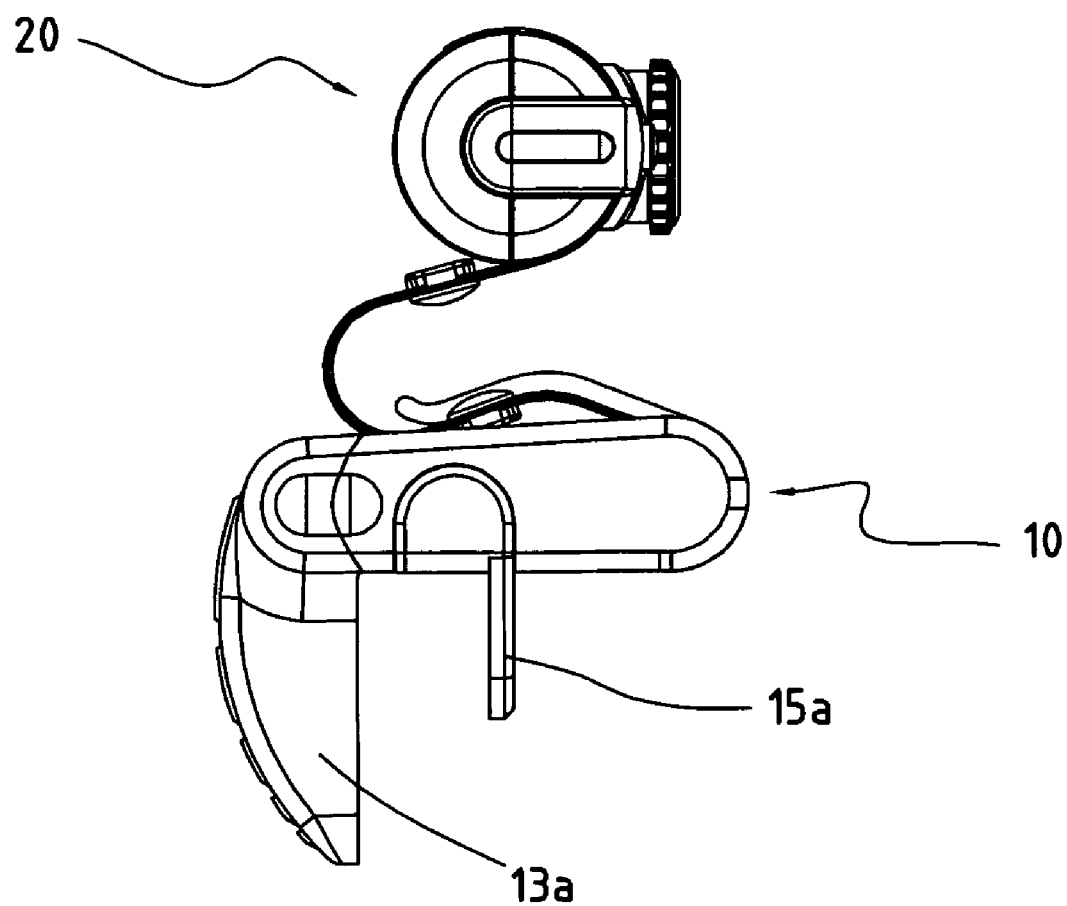
FIG. 4B shows a side elevational view similar to FIG. 4A illustrating the wallboard of the first wall portion being moved far from the second wall portion of the moving portion.

Referring to FIG. 3 again, the clamping base 10 of the present invention includes a body 11, a moving portion 13, and a first wall portion 15. The body 11 can be in a slightly rectangular shape. The top of the body 11 is attached with the pressing plate 11a, and the bottom thereof is detachably engaged with the first wall portion 15. Further, it can be seen that the pressing plate 11a at an end thereof joined to a lateral side of the body and the moving portion 13 is disposed at another lateral side of the body opposite to the lateral side joining the pressing plate 11a. The body 11 has a semicircular recess and an L shaped groove (not shown) at another two opposite lateral sides thereof respectively. The first wall portion 15 further provides a horizontal plate section with a long lateral side thereof extending downward a wallboard 15a and a semicircular upper plate section with an L shaped fitting piece at the inner side thereof extends upward from two short sides of the first wall portion 15 respectively corresponding to the semicircular recess and the L shaped groove. In addition, a split type engaging bar is disposed at the center of the horizontal plate section for engaging with the bottom of the body with the semicircular plate section and the L shaped fitting piece fitting with the semicircular recess and the L shaped groove respectively. Referring to FIG. 4A and FIG. 4B, the first wall portion 15 can be engaged with the body 11 in two ways. In FIG. 4a, the wallboard 15a of the first wall portion 15 is engaged to the body 11 in a way of being close to the second wall portion 13a. In FIG. 4B, the wallboard 15a of the first wall portion 15 is engaged to the body 11 in a way of being far from the second wall portion 13a. That is, the position of the first wall portion 15 shown in FIG. 4A is opposite to the position of the first wall portion 15 shown in FIG. 4B.

Figure 5:
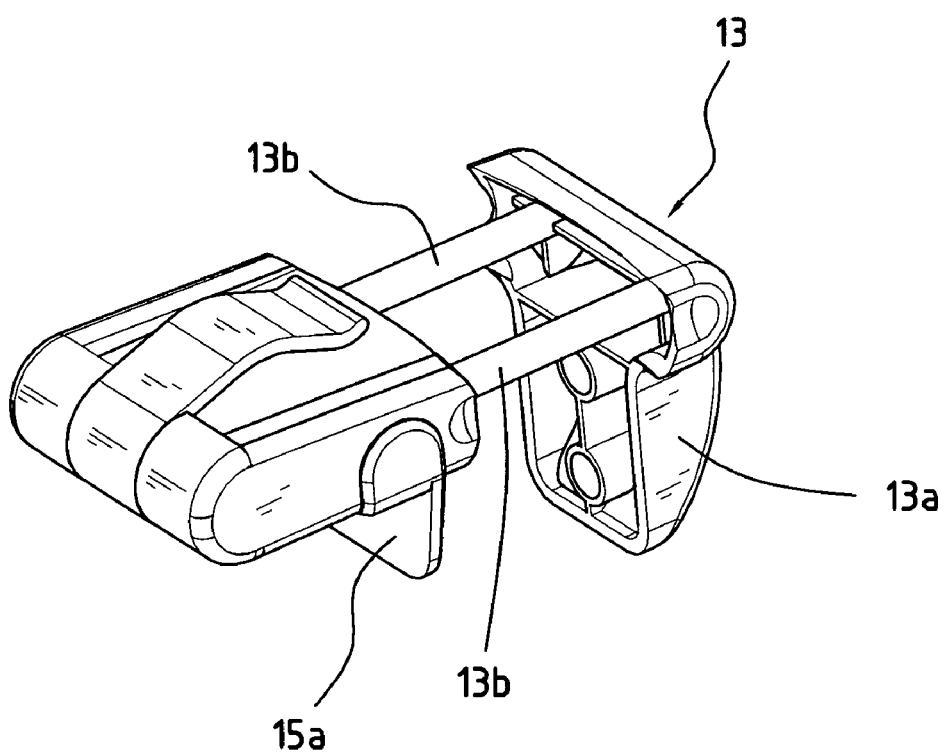
FIG. 5 shows a perspective view illustrating the moving portion being pulled away the body.
Figure 6:
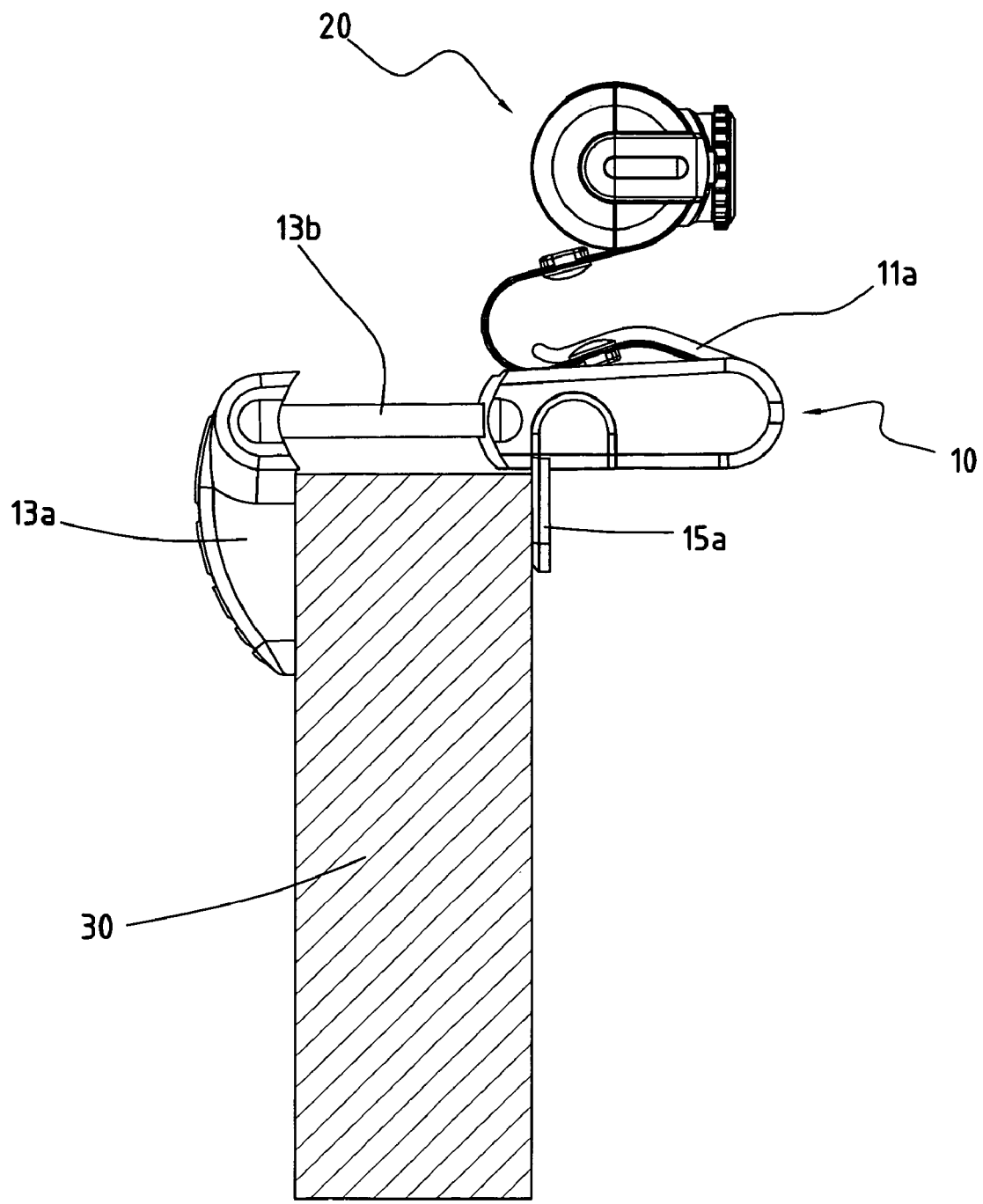
FIG. 6 shows a side elevational view of the clamping base of the invention with the camera illustrating the clamping base holding an electronic device.

Referring to FIG. 5, the moving portion 13 further includes two parallel sliding rods 13b, and the second wall portion 13a set at one end of each of the sliding rods 13b. The other end of the respective sliding rod 13b is set inside the body 11 so that the sliding rods 13b are movable inward and outward the body 11. In other words, the sliding rods 13b are capable of being pushed into and pulled out the body. In this way, the distance between the second wall portion 13a and the wallboard 15a can be changed while the clamping base of the invention being in use. Referring to FIG. 6, when the clamping base 10 of the present invention is in use, the moving portion 13 is pulled away the body 11 with the slide rods 13b and the wallboard 15a is engaged to the body at a selected position such that the second wall portion 13a and the wallboard 15a are capable of pressing against the two sides of the electronic device 30. The electronic device 30 can be a notebook or an LCD. The distance between the second wall portion 13a and the wallboard 15a can be flexibly varied depending on the lengths of the sliding rod 13b being pulled outward the body 11 and the position of engagement between the first wall portion 15 and the body 11 in accordance with different electronic devices.

Figure 7A:
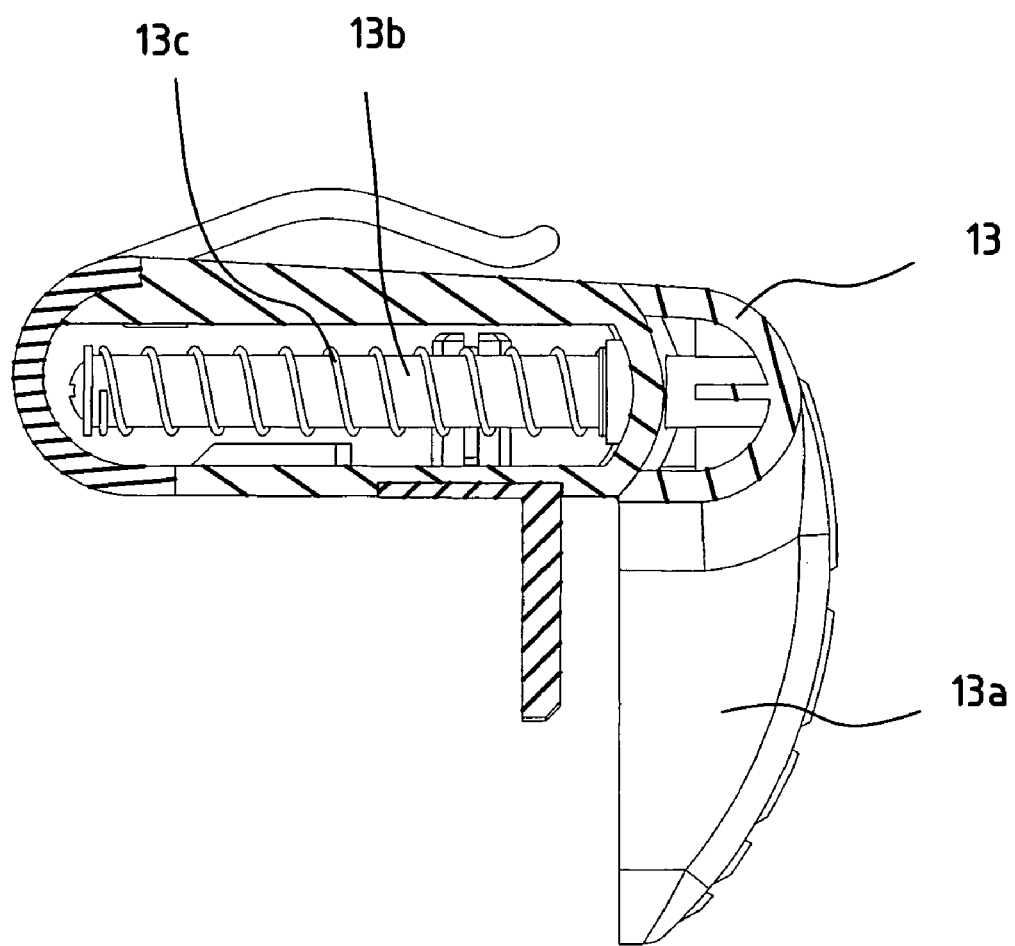
FIG. 7A shows a sectional view of the body and the moving portion of the present invention illustrating the moving portion being not pulled away the body.
Figure 7B:
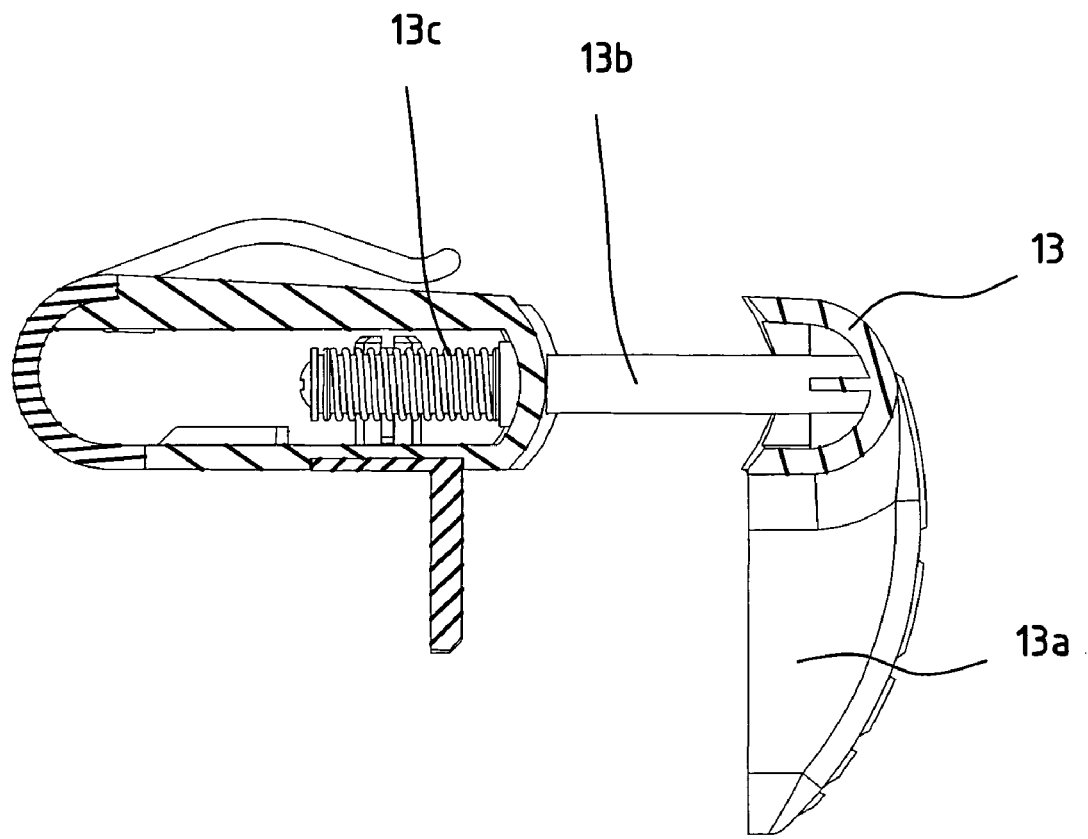
FIG. 7B shows a sectional view of the body and the moving portion of the present invention illustrating the moving portion being pulled away the body.

Referring to FIG. 7A and FIG., an elastic element 13c, such as a spring, is provided to coil around the respective sliding rod 13b of the moving portion 13 in the body 11. An end of the elastic element 13c is fixedly joined to the free end of the respective sliding rod 13b and another end of the elastic element 13c presses against a lateral side of the body 11 next to the moving portion 13. Thus, the second wall portion 13a can be tightly pressed against the electronic device 30 by the elasticity of the spring.

The clamping base 10 of the present invention allows the camera 20 to be easily held and detached at the same time. Furthermore, the clamping base 10 provides an extensible moving portion 13. Together with the various combinations of the second wall portion 15 and the body 11, the clamping base 10 of the present invention can hold the camera 20 on the electronic device 30 with any thickness. The clamping base 10 of the present invention can be adapted to any type of camera 20, such as a web cam, a digital camera, etc.

Those skilled in the art are to be noted that the present invention can be modified without leaving the scope and spirit of the present invention. The scope of the present invention is covered by the appended claims and all the substantial equivalents of variation and arrangement.

What is claimed is:

1. A clamping base for holding a camera and clamping an electronic device, comprising:
    a body with four lateral sides, having a pressing plate at the top thereof with an end of the pressing plate joined to a first of said lateral sides thereof for pressing and holding an elastic plate of the camera;
    a moving portion, being movably attached to a second of said lateral sides of the body, which is opposite to the first lateral side; and
    a first wall portion having a wallboard detachably engaging with the bottom of the body and extending downward;
    wherein, the moving portion further comprises:
        two sliding rods, each of the sliding rods being fixed to the moving portion at a first end thereof and being received in the body at a second end thereof;
        a second wall portion, extending downward from the moving portion opposite to the wallboard of the first wall portion; and
        an elastic element, surrounding each of the sliding rods respectively with an end thereof being fixedly joined to the second end of the respective sliding rod and another end thereof pressing against the second lateral side of the body;
    whereby, once the moving portion is pulled away the body by a user with the sliding rods and the second wall portion against elastic force of the elastic element, a distance is formed between the first wall portion and the second wall portion; and once the moving portion is stopped being pulled away the body, the electronic device is clamped by the second wall portion with the elastic force against the first wall portion.

2. The clamping base as defined in claim 1, wherein the body provides a semicircular recess with an L shaped fitting groove at another two of said opposite lateral sides thereof respectively.

3. The clamping base as defined in claim 1, wherein the first wall portion further comprises a horizontal plate section, a split type engaging bar at the center of the plate section and a semicircular upper plate section at two ends of the plate section respectively with an L shaped fitting piece projecting from the inner side of the upper plate section.

4. The clamping base as defined in claim 1, wherein the first wall portion includes a horizontal plate section having a first side edge and an opposite second side edge, and the wallboard is connected to the first side edge wherein the first wall portion engages with the body such that the wallboard is closer to the second wall portion than the second side edge.

5. The clamping base as defined in claim 1, wherein the first wall includes a horizontal plate section having a first side edge and an opposite second side edge, and the wallboard is connected to the first side edge wherein the first wall portion engages with the body such that the wallboard is farther away from the second wall portion than the second side edge.

6. The clamping base as defined in claim 1, wherein the elastic plate of the camera is for insertion under and held by the pressing plate.

* * * * *